(12) United States Patent
Ishihara et al.

(10) Patent No.: US 11,134,679 B2
(45) Date of Patent: Oct. 5, 2021

(54) METHOD FOR GROWING PLANT

(71) Applicant: KAO CORPORATION, Tokyo (JP)

(72) Inventors: Yasuhiro Ishihara, Wakayama (JP); Akihiro Tanoue, Wakayama (JP)

(73) Assignee: KAO CORPORATION, Tokyo (JP)

( * ) Notice: Subject to any disclaimer, the term of this patent is extended or adjusted under 35 U.S.C. 154(b) by 17 days.

(21) Appl. No.: 16/080,917

(22) PCT Filed: Apr. 11, 2017

(86) PCT No.: PCT/JP2017/014790
§ 371 (c)(1),
(2) Date: Aug. 29, 2018

(87) PCT Pub. No.: WO2017/179566
PCT Pub. Date: Oct. 19, 2017

(65) Prior Publication Data
US 2019/0037842 A1  Feb. 7, 2019

(30) Foreign Application Priority Data
Apr. 11, 2016  (JP) .............................. JP2016-079001

(51) Int. Cl.
A01N 35/00 (2006.01)
A01N 35/04 (2006.01)
A01N 25/02 (2006.01)
C05F 11/00 (2006.01)
C05G 3/00 (2020.01)

(52) U.S. Cl.
CPC .............. A01N 35/00 (2013.01); A01N 25/02 (2013.01); A01N 35/04 (2013.01); C05F 11/00 (2013.01); C05G 3/00 (2013.01)

(58) Field of Classification Search
None
See application file for complete search history.

(56) References Cited

U.S. PATENT DOCUMENTS

| 4,018,591 | A | 4/1977 | Buttarelli |
| 5,391,542 | A * | 2/1995 | Browning .............. A01N 25/30 504/351 |
| 5,922,646 | A | 7/1999 | Schnabel et al. |
| 5,994,266 | A | 11/1999 | Hobbs et al. |
| 2002/0039971 | A1 | 4/2002 | Hayashi et al. |
| 2004/0084366 | A1 | 5/2004 | Anderson et al. |
| 2013/0217868 | A1 | 8/2013 | Fackler et al. |
| 2015/0041083 | A1 | 2/2015 | Yoshikawa et al. |
| 2019/0037842 | A1 | 2/2019 | Ishihara et al. |

FOREIGN PATENT DOCUMENTS

| CN | 1330057 A | 1/2002 |
| CN | 1537830 A | 10/2004 |
| CN | 101497794 A | 8/2009 |
| CN | 102181506 A | 9/2011 |
| CN | 102612503 A | 7/2012 |
| CN | 103068888 A | 4/2013 |
| CN | 103183541 A | 7/2013 |
| CN | 103288553 A | 9/2013 |
| CN | 103998617 A | 8/2014 |
| CN | 104202962 A | 12/2014 |
| JP | 45-3171 B | 2/1970 |
| JP | 49-99844 A | 9/1974 |
| JP | S60-92219 A | 5/1985 |
| JP | 62-61564 B2 | 12/1987 |
| JP | 2-289481 A | 11/1990 |
| JP | 5-874 A | 1/1993 |
| JP | H05-117125 A | 5/1993 |
| JP | 6-65016 A | 3/1994 |
| JP | H08-12479 A | 1/1996 |
| JP | 8-259408 A | 10/1996 |
| JP | 9-154482 A | 6/1997 |
| JP | H09-509417 A | 9/1997 |
| JP | 9-512538 A | 12/1997 |
| JP | H07-273472 A | 10/1998 |
| JP | H11-292671 A | 10/1999 |
| JP | H11-513988 A | 11/1999 |
| JP | 11-514846 A | 12/1999 |
| JP | 2000-139221 A | 5/2000 |
| JP | 2000-264809 A | 9/2000 |
| JP | 2001-316207 A | 11/2001 |
| JP | 2004-224893 A | 8/2004 |
| JP | 2004-300419 A | 10/2004 |
| JP | 2006-504524 A | 2/2006 |
| JP | 2006-213900 A | 8/2006 |
| JP | 2012-17459 A | 1/2012 |
| JP | 2013-14737 A | 1/2013 |
| JP | 2013-505892 A | 2/2013 |
| JP | 2013-505964 A | 2/2013 |
| JP | 2013-241391 A | 12/2013 |

(Continued)

OTHER PUBLICATIONS

International Search Report for PCT/JP2017/014790 (PCT/ISA/210) dated May 16, 2017.
International Preliminary Report on Patentability and English Translation of the Written Opinion of the International Searching Authority (Forms PCT/IB/373, and PCT/ISA/237) For International Application No. PCT/JP2017/009692, dated Oct. 16, 2018.
Yokoi, "The Technique for Improving Soil Physical Characteristics by Preventing the Formation of Soil Crust by Dressing the Sandy Pyroclastic Deposits", J. Jpn. Soc. Soil Phys., No. 103, 2006, p. 3-12, with English abstract.
U.S. Appl. No. 16/080,749, filed Aug. 29, 2018.
International Preliminary Report on Patentability and English translation of the Written Opinion of the International Searching Authority (Forms, PCT/IB/373 and PCT/ISA/237) For International Application No. PCT/JP2017/014790, dated Oct. 16, 2018.

(Continued)

Primary Examiner — Alton N Pryor
(74) Attorney, Agent, or Firm — Birch, Stewart, Kolasch & Birch, LLP

(57) ABSTRACT

The present invention relates to a method for growing a plant, including bringing a lignin decomposition product having an aldehyde yield by alkaline nitrobenzene oxidation of 10% by mass or more into contact with the plant.

5 Claims, No Drawings

(56) References Cited

FOREIGN PATENT DOCUMENTS

| | | | |
|---|---|---|---|
| JP | 2015-006997 A | 1/2015 | |
| JP | 2015-006998 A | 1/2015 | |
| JP | 2015-24365 A | 2/2015 | |
| JP | 2015-509001 A | 3/2015 | |
| JP | 2017-190331 A | 10/2017 | |
| WO | WO 95/22253 A1 | 6/1995 | |
| WO | WO 97/00614 A1 | 1/1997 | |
| WO | WO 2011/038388 A2 | 3/2011 | |
| WO | WO 2011/038389 A2 | 3/2011 | |
| WO | 2013/094398 A1 | 6/2013 | |
| WO | WO 2013/106724 A1 | 7/2013 | |
| WO | WO-2015015223 A1 * | 2/2015 | ............. A01N 35/04 |

OTHER PUBLICATIONS

Lin et al., Eds, "Methods in Lignin Chemistry", Uni Publisher K. K., Jul. 10, 1994, Chapter 6.2.2, p. 220 to Chapter 6.2.2.7 on p. 226.

International Search Report and Written Opinion of the International Searching Authority (forms PCT/ISA/210, PCT/ISA/237 and PCT/ISA/220), dated Apr. 4, 2017 for International Application No. PCT/JP2017/009692, with an English translation of the International Search Report.

"History of the Soil of the Xiang River," 1986, 2 pages.

"Innovations of the Soil Fertilizer in Liaoning and Practical Papers," 2007, pp. 304-306 (5 pages).

"Technical Handbook for High-Efficiency Fetilizers," 2013, p. 778 (3 pages total).

Sakai, "Rural and Agricultural Resource Recycling—Agricultural Practice of Waste Recycling." 2009, p. 89 (3 pages total).

"Pulping and Papermaking of Straw Fiber Raw Materials," Mar. 2013, pp. 198-201.

"Textbook Series for 21st Century," Soil Science, May 1, 2000, p. 83 (3 pages total).

Chinese Office Action and Search Report for Chinese Application No. 201780014363.2, dated Dec. 25, 2020, with English translation of the Office Action.

Japanese Office Action, dated Jan. 12, 2021, for Japanese Application No. 2017-078027 with English machine translation.

Author Unknown, "Chemistry of plant fiber resource," 2012, pp. 150-151 (4 pages total).

Author Unknown, "Fruit Tree Physiology," 1992, pp. 432-433 (4 pages total).

Chinese Office Action and Search Report for Chinese Application No. 201780014315.3, dated Apr. 29, 2020, with partial English translation.

* cited by examiner

METHOD FOR GROWING PLANT

FIELD OF THE INVENTION

The present invention relates to a plant activating agent, a plant activating agent composition, and a method for growing a plant.

BACKGROUND OF THE INVENTION

Various nutritional factors are necessary for plant growth. A shortage of some of the factors is known to hinder plant growth. For example, three major fertilizer factors are: nitrogen which is a component element of proteins; phosphorus which is not only a constituent element of nucleic acids or phospholipids but plays an important role in energy metabolism and synthesis or decomposition reactions of substances; and potassium which has physiological action of substance metabolism or mass transfer. A shortage of these major components generally depauperates plant growth. Calcium is an important component constituting plant bodies and cells and also plays an important role in maintaining the balance of the metabolic system. Therefore, deficiency in calcium causes physiological disorder. In addition, various nutrients such as Mg, Fe, S, B, Mn, Cu, Zn, Mo, Cl, Si, and Na are necessary for plants.

These nutritional components such as nitrogen, phosphorus, and potassium are applied in the form of a base fertilizer or an additional fertilizer, or a liquid fertilizer is diluted and provided by soil drench or foliar spray. Although these fertilizers are essential for plant growth, the application of the fertilizers beyond certain concentrations cannot contribute to improvement in the growability and yields of plants.

However, an important challenge to agricultural production is to increase yields by promoting the growth of agricultural crops and increasing harvests per unit area. For this purpose, various necessary plant growth regulators have been developed and utilized. The plant growth regulators typified by gibberellin, auxin, and the like are used for regulating growth such as sprouting, rooting, elongation, flower formation, or fruit setting, and morphogenic reaction. However, the action of these substances is multifaceted and complicated and limits use.

Various techniques considered to lead to the growth promotion of agricultural crops have heretofore been proposed.

JP-A 2013-505892 describes a fertilizer composition, containing a granular form contacted with a component, such as lignin, containing an agriculturally acceptable complex mixture of an organic substance characterized by partially humified natural organic matter.

JP-A 2013-505964 describes a method for improving the stress response of a plant, including a step of bringing a seed or a portion of a plant, or a site thereof into contact with a composition containing an agriculturally acceptable complex mixture of dissolved organic matter characterized by partially humified natural organic matter.

JP-A 2015-509001 describes a method for bringing about at least one biological action on a plant, including a step of preparing an aqueous mixture of (i) an agriculturally effective amount of complex polymeric polyhydroxy acid having a predetermined amount of total organic carbon and capable of reliably bringing about at least one biological action on the plant, and (ii) one or more selected from (a) an agriculturally noneffective amount of one or more agriculturally acceptable ion sources of transition metal cations, and/or (b) a plant-harmful amount of at least one salt of an alkali (or alkaline earth) metal cation, wherein the aqueous mixture is suitable for contact with the plant, a seed, or a vegetated location thereof.

JP-A 5-874 describes a plant growth promoter, consisting of a humic substance extracted by the alkaline treatment of lignin charcoal or lignin charcoal containing the humic substance, and an extract extracted by the fermentation treatment or hydrolysis treatment of plant-derived oil cake or fermented or hydrolyzed plant-derived oil cake.

Japanese Patent Publication No. 45-3171 describes a method for producing a soil improvement agent for a suspension, wherein charcoal such as grass peat, peat and brown coal having a low degree of humification is immersed in an alkaline solution at a concentration of around 5% to around 10% and treated by adding an acid thereto, followed by neutralization.

SUMMARY OF THE INVENTION

As a result of applying a large amount of a fertilizer into the soil for the purpose of increasing crop yields, problems arise in such a way that: the absorption of the fertilizer is ill-balanced due to an excess of various factors in the soil; the yield increase of interest cannot be achieved due to the sluggish growth of plants, etc.; and quality such as sugar content (Brix. value) is not enhanced. Since there is a limitation on the nutrient absorption of roots as well, attempts have also been made to allow phylloplanes or fruits to directly absorb an aqueous solution or an aqueous suspension of necessary fertilizer elements by spraying. However, the mere foliar spray of an aqueous solution of necessary elements presents problems associated with absorption efficiency. The excessive spraying of fertilizer components rather imposes stress on plants and results in crop injury.

Under such circumstances, there is a demand for a plant vitalizer and a method for growing a plant, that exhibit an excellent growth promoting effect on plants without causing crop injury, etc. in the plants.

The present invention relates to a plant activating agent containing, as an effective component, a lignin decomposition product having an aldehyde yield by alkaline nitrobenzene oxidation of 10% by mass or more.

The present invention relates to a plant activating agent composition, containing a lignin decomposition product having an aldehyde yield by alkaline nitrobenzene oxidation of 10% by mass or more.

The present invention relates to a method for growing a plant, including bringing a lignin decomposition product having an aldehyde yield by alkaline nitrobenzene oxidation of 10% by mass or more into contact with the plant.

According to the present invention, a plant activating agent, a plant activating agent composition, and a method for growing a plant, that exhibit an excellent growth promoting effect on plants without causing crop injury, etc. in the plants are provided.

EMBODIMENTS OF THE INVENTION

<Plant Activating Agent>

The plant activating agent of the present invention contains, as an effective component, a lignin decomposition product having an aldehyde yield by alkaline nitrobenzene oxidation of 10% by mass or more (hereinafter sometimes referred to as a lignin decomposition product of the present invention). The present invention includes the plant activating agent including the lignin decomposition product of the present invention.

The aldehyde yield of the lignin decomposition product of the present invention is 10% by mass or more. This aldehyde yield is preferably 12% by mass or more, more preferably 15% by mass or more, further preferably 20% by mass or more, furthermore preferably 21% by mass or more, and furthermore preferably 22% by mass or more, and preferably 40% by mass or less, more preferably 35% by mass or less, and further preferably 30% by mass or less from the viewpoint of preventing reduction in production efficiency due to excessive treatment.

The lignin decomposition product of the present invention is obtained by decomposing natural lignin obtained from plant biomass.

Natural lignin forms macromolecules, mainly through β-O-4 bonds. The decomposition of the β-O-4 bonds and various condensation reactions of lignin proceed in the process in which lignin is extracted from plant biomass, resulting in change in the constitution of bonds in lignin. Alkaline nitrobenzene oxidation is a technique for decomposing β-O-4 bonds in lignin and quantifying the amount of the β-O-4 bonds from generated aldehyde monomers. That is, aldehyde yield by alkaline nitrobenzene oxidation indicates the degree of lignin modification, and indicates that the degree of modification becomes lower as its value becomes higher. As lignin becomes less modified, the contents of aliphatic OH groups and phenolic OH groups become higher, and the reactivity becomes higher. It is predicted that the growth promoting effect on plants can be improved by using less modified lignin in the plants in the present invention.

As to a method for alkaline nitrobenzene oxidation of the lignin decomposition product, an alkaline nitrobenzene oxidation method described in, for example, "Methods in lignin chemistry" (issued by Uni Publisher K. K., Jul. 10, 1994) can be referred to in the present invention.

The aldehyde yield measured specifically under the following conditions is adopted as the aldehyde yield of the lignin decomposition product in the present invention.
[Method for Measuring Aldehyde Yield of Lignin Decomposition Product]

A 20 ml vial is charged with 50 to 200 mg of a lignin decomposition product, which is a measuring object, 6 to 10 ml of a 2 M sodium hydroxide solution and 0.4 ml of nitrobenzene, and the mixture is heated at 170° C. for 2.5 hours with stirring at 900 rpm. The mixture is cooled after heating, followed by extracting 3 times with 5 to 15 ml of diethyl ether to remove a nitrobenzene reduction product and excessive nitrobenzene. Concentrated hydrochloric acid is added to the remaining aqueous layer, followed by adjusting the pH to 1 to 3 and further extracting 3 times with 5 to 15 ml of diethyl ether. This diethyl ether extract is distilled under a reduced pressure to obtain an oxidization mixture. To this oxidization mixture is added 20 mL of dichloromethane. Then, 2 ml of the mixture is filtered through a Millipore HVHP membrane (manufactured by Millipore Japan K. K., 0.45 μm in pore size) and subjected to gas chromatography (GC).

A GC device (manufactured by Agilent Technologies Japan, Ltd.) equipped with an Agilent J&W GC column DB-5 (manufactured by Agilent Technologies Japan, Ltd.) is used for gas chromatography. The conditions of gas chromatography are as follows: a sample volume of 1.0 μL, a helium flow rate of 10 ml/min, an injection port temperature of 200° C., and a split ratio of 10:1. The temperature conditions are as follows: the temperature is maintained at 60° C. for 1 minute, then raised from 60 to 250° C. at 5° C./min and maintained at 250° C. for 10 minutes. With regard to quantification, calibration curves of peak area versus content are created using three aldehydes, which are vanillin, syringa aldehyde and para-hydroxybenzaldehyde, as reagents, respectively. The yields of the above-mentioned three aldehydes in the lignin decomposition product are determined separately. The aldehyde yield (%) is calculated by the following expression.

Aldehyde yield (%)=(aldehyde mass yield obtained by totaling amounts of three aldehydes/mass of lignin decomposition product)×100

The weight average molecular weight of the lignin decomposition product of the present invention is preferably 1,000 or more and 100,000 or less. This weight average molecular weight is more preferably 3,000 or more, further preferably 4,500 or more, and furthermore preferably 8,000 or more, and more preferably 50,000 or less, further preferably 30,000 or less, furthermore preferably 26,000 or less, and furthermore preferably 20,000 or less from the viewpoint of easy influx into plants from the site of action.

In the present invention, the weight average molecular weight of the lignin decomposition product is measured under the following conditions.
[Method for Measuring Weight Average Molecular Weight of Lignin Decomposition Product]

The weight average molecular weight of the lignin decomposition product is measured by the following operation under the following conditions by gel permeation chromatography (GPC).
[GPC Operation]

The measurement is performed by injecting 100 μL of a sample solution (1 mg/mL) containing a lignin decomposition product. The molecular weight of the sample is calculated based on a calibration curve prepared beforehand.
[GPC Conditions]
  Model: HLC-8120GPC (Tosoh Corporation)
  Detector: RI detector
  Separation column: Two TSK-GEL α-M columns (Tosoh Corporation)
  Guard column: TSKgel guardcolumn α (Tosoh Corporation)
  Column temperature: 40° C.
  Eluent: N,N-Dimethylformamide solution to which 60 mmol/L $H_3PO_4$ and 50 mmol/L LiBr are added
  Flow rate of eluent: 1 mL/min
  Standard sample: Monodisperse polystyrene mixed solution [A-500 (molecular weight $5.0 \times 10^2$), F-10 (molecular weight $9.64 \times 10^4$), and F-850 (molecular weight $8.42 \times 10^6$) produced by Tosoh Corporation; and products (molecular weight $4.0 \times 10^3$, $3.0 \times 10^4$, $9.29 \times 10^5$) produced by Pressure Chemical Company]

The lignin decomposition product of the present invention can be obtained by the decomposition of plant biomass.

Examples of a method for producing a plant activating agent containing the lignin decomposition product of the present invention include a method for producing a plant activating agent, that has the following step 1 and step 2a, and a method for producing a plant activating agent, that has the following step 1 and step 2b.
Step 1: treating plant biomass with 8 parts by mass or more and 70 parts by mass or less of a basic compound and 10 parts by mass or more and 10,000 parts by mass or less of water relative to 100 parts by mass of the solid content of the plant biomass under the condition that the H-factor is 3,000 or less.

Step 2a: obtaining a lignin decomposition product as a water soluble component from the plant biomass that has undergone step 1 and adding an acid thereto to obtain a suspension containing the lignin decomposition product.

Step 2b: obtaining a lignin decomposition product as a water soluble component from the plant biomass that has undergone step 1, purifying the lignin decomposition product by the addition of an organic solvent, and adding an acid thereto to obtain a suspension containing the lignin decomposition product.

Plant Biomass is Used in Step 1.

Examples of the plant biomass include herbaceous biomass and ligneous biomass. Among these, herbaceous biomass is preferable.

The herbaceous biomass means plant other than trees inhabiting grassland, or non-ligneous plant parts. Specific examples include plant materials of Gramineae, Malvaceae and Leguminosae, and non-ligneous materials of Palmae.

Examples of the plant materials of Gramineae include bagasse such as sugarcane bagasse and sorghum bagasse, switchgrass, elephant grass, corn stover, corncob, rice straw, wheat straw, barley, Japanese pampas grass, grass, Johnson grass, Erianthus, and napier grass. Examples of the plant materials of Malvaceae include kenaf and cotton plant. Examples of the plant materials of Leguminosae include alfalfa. Examples of the non-ligneous materials of Palmae include empty fruit bunches of oil palm.

Among these, the plant materials of Gramineae are preferable, sugarcane bagasse, corncob and rice straw are more preferable, and sugarcane bagasse is further preferable from a viewpoint of productivity and handleability.

Examples of the ligneous biomass include various wood such as wood chips obtained from conifer such as Japanese larch and swamp cypress, and broadleaf trees such as oil palm and Japanese cypress; and wood pulp produced from these woods.

These types of plant biomass may be used alone or in combination of two or more.

Although the plant biomass can also be used without pulverization treatment, the plant biomass is preferably subjected to pulverization treatment from the viewpoint of efficiency in treatment.

A basic compound (hereinafter sometimes referred to as an "alkali") is used in step 1.

Examples of the basic compound include alkali metal hydroxides such as sodium hydroxide, potassium hydroxide and lithium hydroxide; alkaline earth metals hydroxides such as magnesium hydroxide and calcium hydroxide; alkali metal oxides such as sodium oxide and potassium oxide; alkaline earth metals oxides such as magnesium oxide and calcium oxide; alkaline metal sulfides such as sodium sulfide and potassium sulfide; alkaline earth metals sulfides such as magnesium sulfide and calcium sulfide; quaternary ammonium hydroxides such as tetramethylammonium hydroxide and tetrabutylammonium hydroxide. Among these, the basic compound is preferably an alkali metal hydroxide or an alkaline earth metal hydroxide, more preferably an alkali metal hydroxide, and further preferably sodium hydroxide from the viewpoint of improvement in the yield of the lignin decomposition product of the present invention. These basic compounds can be used alone or in combination of two or more.

The H-factor (hereinafter also called HF) has been used conventionally as a control index in the digestion step of pulp, and is one variable as which the effects of temperature and time is defined.

When the temperature is high, the reaction of the treatment of step 1 is promoted. The treatment of step 1 also relates to time at the same time. Therefore, the relative velocity at another temperature is calculated by the expression of Arrhenius by setting the delignification reaction velocity at 100° C. as 1. Calculation is performed by the HF, which is a product with the time at the temperature.

In the present invention, the HF is an index indicating the total amount of heat given to the reaction system in the treatment of the biomass using the basic compound, and is expressed by the following Expression (1). The HF is calculated by integrating with respect to the time t for which an aqueous basic compound solution is in contact with the biomass.

[Expression 1]

$$HF=\int_0^t \exp(43.2-16115/T)dt \quad (1)$$

where t is the time (h), T is the absolute temperature (K), and the integration range is 0 to t.

For example, to satisfy that the HF is 3 or more, when heat treatment is performed at 70° C., around 150 hours of the treatment time is necessary. When heat treatment is performed at 85° C., around 20 hours of the treatment time is necessary. When heat treatment is performed at 100° C., around 4.5 hours of the treatment time is necessary.

HF is preferably 0.01 or more, more preferably 0.1 or more, further preferably 1 or more, further preferably 2 or more, and further preferably 3 or more, and preferably 3,000 or less, more preferably 1,500 or less, preferably 1,200 or less, more preferably 1,000 or less, further preferably 400 or less, further preferably 300 or less, further preferably 100 or less, further preferably 50 or less, and further preferably 30 or less from the viewpoint of increasing the recovery factor of the lignin decomposition product of the present invention and economic efficiency in the treatment in step 1.

The lignin decomposition product of the present invention is deposited by adding an acid to the water soluble component after treatment in step 1, and obtained in step 2a.

The water soluble component can be extracted, for example, by separating the liquid portion of the alkali-treated biomass. The water soluble component is preferably extracted by washing the lignin decomposition product existing in the separated solid portion of the alkali-treated biomass with water, dissolving in water, followed by extraction in addition to the above-mentioned separation. Furthermore, the pH of the obtained water soluble component is adjusted to 1 to 5 by the addition of an acid, and the lignin decomposition product is deposited. The obtained lignin decomposition product is centrifuged or filtered, further washed with water, and pH-adjusted to 6 to 8 by the addition of basic matter. Additionally, a basic compound may be removed by a dialysis membrane or the like. The lignin decomposition product thus obtained may be concentrated, mixed with water or other organic solvents, and used in a liquid state, or can be dried and used as a solid by evaporating solvent.

The lignin decomposition product of the present invention is obtained by purifying the lignin decomposition product by the addition of an organic solvent to the water soluble component after treatment in step 1, and adding an acid thereto to deposit the lignin decomposition product in step 2b.

The water soluble component can be extracted, for example, by separating the liquid portion of the alkali-treated biomass of step 1.

The water soluble component can be extracted by washing the lignin decomposition product existing in the separated solid portion (in the solid phase) of the alkali-treated biomass with water, dissolving in water, followed by extraction in addition to the above-mentioned separation.

Furthermore, the lignin decomposition product of the present invention can be obtained by a step of mixing an organic solvent, preferably an organic solvent containing at least one selected from alcohols having 1 or more and 3 or less carbon atoms in the aqueous phase collected from the reaction liquid of step 1 and the aqueous phase collected from the solid portion of the alkali-treated biomass of step 1 to deposit impurities in the mixture, a step of removing the deposited impurities, a step of removing organic solvent from the above-mentioned mixture, and a step of depositing the lignin decomposition product by adding acid. Additionally, acid or a basic compound may be removed from the obtained lignin decomposition product by a dialysis membrane or the like. The thus obtained lignin decomposition product may be dissolved together with water or other solvents, and may be dried into a solid by evaporating solvent.

In the present invention, the following step 3 can also be performed after step 2a or step 2b. The degree of modification and the molecular weight of lignin can be further adjusted by step 3.

Step 3: a step of heating the lignin decomposition product obtained in step 2a or step 2b Step 3 is preferably performed in the absence of solvent.

The heating temperature in step 3 is preferably 60° C. or more, and more preferably 120° C. or more, and preferably 170° C. or less, and more preferably 140° C. or less.

The heating time in step 3 is preferably 1 minute or more, and more preferably 3 minutes or more, and preferably 30 minutes or less, and more preferably 10 minutes or less.

In the present invention, the molecular weight of the obtained lignin decomposition product can also be adjusted by fraction if needed.

Although the form of the plant activating agent of the present invention may be either of solid and liquid, solid is preferable. Powder is preferable among solids. The average particle sizes of the powder may be 3 μm or more and 30 μm or less. It is preferable that the lignin decomposition product of the present invention is powder, and is furthermore a powder having the above-mentioned average particle size.

Examples of plants to which the plant activating agent of the present invention can be applied include Cucurbitaceae, Solanaceae, Red pepper family, Rosaceae, Malvaceae, Leguminosae, Gramineae, Brassicaceae, Alliaceae, Amaryllidaceae, Compositae, Amaranthaceae, Umbelliferae, Zingiberaceae, Lamiaceae, Araceae, Convolvulaceae, Dioscoreaceae, and Nelumbonaceae. Specifically, examples of fruit vegetables include cucumbers, pumpkins, watermelons, melons, tomatoes, eggplants, bell peppers, strawberries, okras, green beans, broad beans, peas, immature soybeans, and corns. Examples of leaf vegetables include Chinese cabbages, pickled greens, Ching Guang Juai, cabbages, cauliflowers, broccolis, brussels sprouts, onions, welsh onions, garlics, rakkyos, Chinese chives, asparaguses, lettuces, butter lettuces, celeries, spinaches, garland chrysanthemums, parsleys, mitsubas, cicelies, *udo* salad plants, *mioga* gingers, sweet coltsfoot, and Japanese basils. Examples of root vegetables include daikon radishes, turnips, burdocks, carrots, potatoes, eddoes, sweet potatoes, yams, gingers, and lotuses. In addition, the plant activating agent of the present invention may be used for rice, wheat varieties, flowers, and the like. The present invention can be preferably applied to cereals such as beans such as soybeans and immature soybeans, which tend to be cultivated at a large scale.

<Plant Activating Agent Composition>

The plant activating agent composition of the present invention contains a lignin decomposition product having an aldehyde yield by alkaline nitrobenzene oxidation of 10% by mass or more, i.e., the lignin decomposition product of the present invention. The preferable aspects of the lignin decomposition product used in the plant activating agent composition of the present invention are the same as those shown for the plant activating agent of the present invention.

The plant activating agent composition of the present invention contains the lignin decomposition product of the present invention in an amount of preferably 5% by mass or more, more preferably 15% by mass or more, and further preferably 30% by mass or more, and preferably 90% by mass or less, more preferably 80% by mass or less, and further preferably 70% by mass or less from the viewpoint of the ease of preparation into a form for treatment.

The plant activating agent composition of the present invention can contain components other than the lignin decomposition product of the present invention.

The plant activating agent composition of the present invention can contain a surfactant from the viewpoint of increase in the amount of the lignin decomposition product attached and penetrating to the site of action.

Examples of the surfactant include one or more surfactants selected from a nonionic surfactant, an anionic surfactant, a cationic surfactant, and an amphoteric surfactant. The surfactant is preferably a nonionic surfactant.

Examples of the nonionic surfactant include polyoxyethylene sorbitan fatty acid ester, polyoxyethylene fatty acid ester, polyglycerin fatty acid ester, polyoxyethylene alkyl ether, polyoxyethylene alkyl aryl ether, polyoxyalkylene aryl ether, polyoxyethylene alkenyl ether, and polyoxyalkylene alkyl polyglycoside.

Examples of the anionic surfactant include sodium mono- and di-alkylnaphthalene sulfonate, sodium alpha-olefin sulfonate, sodium alkane sulfonate, alkyl sulfosuccinate, alkyl sulfate, polyoxyalkylene alkyl ether sulfate, polyoxyalkylene alkyl aryl ether sulfate, mono- and di-alkylbenzene sulfonate, alkylnaphthalene sulfonate, mono- and di-alkyl phosphate, polyoxyalkylene mono- and di-alkyl phosphate, fatty acid salts, linear and branched alkyl polyoxyalkylene ether acetic acids or salts thereof, and fatty acid N-methyltaurine. Examples of the salts include metal salts (Na, K, Ca, Mg, Zn, etc.), ammonium salts, alkanolamine salts, and aliphatic amine salts.

Examples of the cationic surfactant include polyoxyethylene alkylamine salts, polyoxypropylene alkylamine salts, polyoxyethylene tallow amine salts, polyoxyethylene oleylamine salts, and dialkylamine salt derivatives. Examples of the dialkylamine derivatives include dialkyl monomethyl hydroxyethyl ammonium propionate, dialkyl monomethyl benzalkonium chloride, and dialkyl monomethyl ethylammonium ethyl sulfate.

Examples of the amphoteric surfactant include amino acids such as alkyl amino propionate, alkylamidopropylbetaines, imidazolines, alkylhydroxysulfobetaines, and amine oxides such as alkyldimethylamine oxide, alkyldiethanolamine oxide, and alkylamidopropylamine oxide.

When the plant activating agent composition of the present invention contains a surfactant, the surfactant is contained in an amount of preferably 1 part by mass or more, more preferably 10 parts by mass or more, and further preferably 50 parts by mass or more, and preferably 1,900 parts by mass or less, more preferably 600 parts by mass or less, and further preferably 300 parts by mass or less per 100 parts by mass of the lignin decomposition product of the present invention.

The plant activating agent composition of the present invention can contain a water soluble polymer from the viewpoint of increase in the amount of the lignin decomposition product attached to the site of action. Herein, the term "water soluble" as to the water soluble polymer refers to dissolving 1 g or more in 100 g of water of 20° C.

Any of natural, semisynthetic, and synthetic polymers can be used as the water soluble polymer. Among them, a water soluble polysaccharide polymer is preferable. Specific examples of the water soluble polysaccharide polymer include guar gum, xanthan gum, starch, cellulose, tara gum, locust bean gum, carrageenan, and their derivatives. Examples of the guar gum derivative include hydroxypropyl guar gum, carboxymethylhydroxypropyl guar gum, and cationized guar gum. Examples of the xanthan gum derivative include hydroxypropyl xanthan gum. Examples of the starch derivative include carboxymethylated starch, hydroxyalkylated starch, hydroxypropyl cross-linked starch, grafted starch, and starch acetate. Examples of the cellulose derivative include hydroxyethylcellulose, hydroxypropylcellulose, hydroxypropylmethylcellulose, and carboxymethylcellulose. The water soluble polysaccharide polymer is more preferably hydroxypropylmethyl cellulose.

When the plant activating agent composition of the present invention contains a water soluble polymer, the water soluble polymer is contained in an amount of preferably 1 part by mass or more, more preferably 10 parts by mass or more, and further preferably 50 parts by mass or more, and preferably 1,900 parts by mass or less, more preferably 600 parts by mass or less, and further preferably 300 parts by mass or less per 100 parts by mass of the lignin decomposition product of the present invention.

The plant activating agent composition of the present invention can contain, for example, a fertilizer component in addition to these. Specifically, a fertilizer component available under trade name such as HYPONICA (Kyowa Co., Ltd.) or HYPONEX can be contained in an amount of 1 part by mass or more and 1,900 parts by mass or less per 100 parts by mass of the lignin decomposition product.

The form of the plant activating agent composition of the present invention can be any of liquids, flowables, pastes, wettable powders, granules, dusts, tablets, and the like.

<Method for Growing Plant>

The method for growing a plant of the present invention includes bringing a lignin decomposition product having an aldehyde yield by alkaline nitrobenzene oxidation of 10% by mass or more, i.e., the lignin decomposition product of the present invention, into contact with the plant. The preferable aspects of the lignin decomposition product used in the method for growing a plant of the present invention are the same as those shown for the plant activating agent of the present invention. Plants to which the method for growing a plant of the present invention can be applied are the same as those shown for the plant activating agent of the present invention.

Various approaches can be used in the method for bringing the lignin decomposition product of the present invention into contact with the plant. Examples thereof include a method of directly applying a dust or granules containing the lignin decomposition product of the present invention, as in fertilizers. Further examples thereof include: a method of directly spraying a treating solution containing the lignin decomposition product of the present invention to plants such as phylloplanes, stems, or fruits; a method of injecting the lignin decomposition product of the present invention or a chemical solution containing this into the soil; and a method of using a culture medium containing the lignin decomposition product of the present invention in hydroponic cultivation, for example, water culture or culture using rock wool.

The method for growing a plant of the present invention preferably has a step of bringing a treating solution containing the lignin decomposition product of the present invention and water into contact with the plant.

The treating solution containing the lignin decomposition product of the present invention and water can be brought into contact with an underground part or an above-ground part of the plant in the method for growing a plant of the present invention.

The treating solution can contain a component other than the lignin decomposition product mentioned for the plant activating agent, for example, a surfactant, a water soluble polymer, and a fertilizer component.

The present invention provides a method for growing a plant, including foliar-spraying a treating solution containing the lignin decomposition product of the present invention and water to bring the lignin decomposition product into contact with the plant. This method can promote the rooting of a plant and can be used as a method for promoting the rooting of a plant. Also, underground part weight can be increased. Furthermore, this method can increase the number of branches and can be used as a method for increasing the number of branches of a plant. Moreover, this method can also increase the number of flowers and can be used as a method for increasing the number of flowers of a plant.

The method for growing a plant of the present invention can have a step of foliar-spraying a treating solution containing the lignin decomposition product of the present invention and water to bring, for example, transiently or for a long period of time, the lignin decomposition product of the present invention into contact with the plant. Alternatively, the lignin decomposition product of the present invention may be mixed with water and brought into contact with a root during watering.

The content of the lignin decomposition product of the present invention in the treating solution for foliar spray is preferably 1 ppm or more, more preferably 8 ppm or more, further preferably 20 ppm or more, and furthermore preferably 40 ppm or more, and preferably 5,000 ppm or less, more preferably 1,000 ppm or less, further preferably 500 ppm or less, and furthermore preferably 300 ppm or less of the lignin decomposition product.

The present invention provides a method for growing a plant, including using the lignin decomposition product as a culture solution for hydroponic cultivation to bring the lignin decomposition product into contact with the plant. This method can promote the rooting of a plant and can be used as a method for promoting the rooting of a plant. Also, underground part weight can be increased.

The method for growing a plant of the present invention can have a step of bringing, for example, transiently or for a long period of time, a treating solution containing the lignin decomposition product of the present invention and water into contact with an underground part of the plant as a culture solution for hydroponic cultivation.

The content of the lignin decomposition product of the present invention in the culture medium is preferably 1 ppm or more, more preferably 4 ppm or more, further preferably 8 ppm or more, and furthermore preferably 20 ppm or more, and preferably 3,000 ppm or less, more preferably 1,000 ppm or less, further preferably 100 ppm or less, and furthermore preferably 80 ppm or less of the lignin decomposition product.

The treating solution can be directly sprayed in the form of a mist or a foam to a phylloplane, a stem, a fruit, or the like in the method for growing a plant of the present invention. A method of spraying the treating solution to an above-ground part of the plant, specifically, a phylloplane, a stem, or a fruit is preferred for effectively exerting the effect of the lignin decomposition product of the present invention. Although the spraying timing is not limited, spraying at the cotyledonal stage, the primary leaf stage, the true leaf stage, the time of flower bud differentiation, the time of flower setting, the time of full flowering, the time of pod setting, the fruiting stage, the seed filling stage, and the fruit enlargement stage, etc. is preferable.

Any approach such as a nebulizer, or an aircraft (a Cessna plane, a radio-controlled helicopter, etc.), a tractor, or a center pivot irrigation system equipped with a nebulizer can be used as an approach for spraying the treating solution.

In the case of spraying the treating solution to the plant, for example, to a phylloplane, the amount of the treating solution sprayed is preferably 3 L/10 a or more, more preferably 5 L/10 a or more, further preferably 20 L/10 a or more, furthermore preferably 30 L/10 a or more, furthermore preferably 40 L/10 a or more, and furthermore preferably 50 L/10 a or more, and preferably 1,000 L/10 a or less, more preferably 500 L/10 a or less, further preferably 300 L/10 a or less, and furthermore preferably 100 L/10 a or less as long as the content of the lignin decomposition product of the present invention in the treating solution falls within the above-mentioned range. Even spraying under the high-water quantity condition such as a center pivot irrigation system produces an excellent growth promoting effect as long as the amount of the spray falls within the above-mentioned range.

In the case of spraying the treating solution to the plant, the spraying timing and the number of sprays of the treating solution are not particularly limited. The spraying can be appropriately performed according to the degree of plant growth in any period from the start of cultivation such as sowing or planting to the completion of cultivation such as harvesting.

According to the present invention, a method for promoting the rooting of a plant, including bringing a lignin decomposition product having an aldehyde yield by alkaline nitrobenzene oxidation of 10% by mass or more into contact with the plant is provided. A treating solution containing the lignin decomposition product and water is preferably foliar-sprayed or used as a culture solution for hydroponic cultivation to bring the lignin decomposition product into contact with the plant, in this method.

According to the present invention, a method for increasing the branch emergence of a plant, including bringing a lignin decomposition product having an aldehyde yield by alkaline nitrobenzene oxidation of 10% by mass or more into contact with the plant is also provided. A treating solution containing the lignin decomposition product and water is preferably foliar-sprayed or used as a culture solution for hydroponic cultivation and more preferably foliar-sprayed to bring the lignin decomposition product into contact with the plant, in this method.

According to the present invention, a method for increasing the number of flowers of a plant, including bringing a lignin decomposition product having an aldehyde yield by alkaline nitrobenzene oxidation of 10% by mass or more into contact with the plant is also provided. A treating solution containing the lignin decomposition product and water is preferably foliar-sprayed or used as a culture solution for hydroponic cultivation and more preferably foliar-sprayed to bring the lignin decomposition product into contact with the plant, in this method.

The items mentioned for the plant activating agent, the plant activating agent composition, and the method for growing a plant of the present invention can be appropriately applied to these methods.

<Aspects of the Present Invention and the Like>

The present invention relates to use, as a plant activating agent, of a lignin decomposition product having an aldehyde yield by alkaline nitrobenzene oxidation of 10% by mass or more.

The present invention relates to use, as a plant activating agent composition, of a composition containing a lignin decomposition product having an aldehyde yield by alkaline nitrobenzene oxidation of 10% by mass or more.

The present invention relates to a lignin decomposition product where the lignin decomposition product is used as a plant activating agent, the aldehyde yield by alkaline nitrobenzene oxidation being 10% by mass or more.

The present invention relates to a composition containing a lignin decomposition product, where the lignin decomposition product is used as a plant activating agent, the aldehyde yield by alkaline nitrobenzene oxidation is 10% by mass or more.

The lignin decomposition product used in these is a lignin decomposition product of the present invention, and preferable aspects thereof are the same as the plant activating agent or the plant activating agent composition of the present invention.

Aspects of the present invention will be illustrated hereinafter. Items described in the plant activating agent, the plant activating agent composition, and the method for growing plants of the present invention can be applied to these aspects properly. The items described in the aspects can be properly applied to one another.

<1>

A plant activating agent containing, as an effective component, a lignin decomposition product having an aldehyde yield by alkaline nitrobenzene oxidation of 10% by mass or more.

<2>

The plant activating agent according to <1>, wherein the aldehyde yield of the lignin decomposition product is 10% by mass or more, preferably 12% by mass or more, more preferably 15% by mass or more, further preferably 20% by mass or more, furthermore preferably 21% by mass or more, and furthermore preferably 22% by mass or more, and preferably 40% by mass or less, more preferably 35% by mass or less, and further preferably 30% by mass or less.

<3>

The plant activating agent according to <1> or <2>, wherein the weight average molecular weight of the lignin decomposition product is preferably 1000 or more, more preferably 3,000 or more, further preferably 4,500 or more, and furthermore preferably 8,000 or more, and preferably 100,000 or less, more preferably 50,000 or less, further preferably 30,000 or less, furthermore preferably 26,000 or less, and furthermore preferably 20,000 or less.

<4>

A plant activating agent composition, containing a lignin decomposition product having an aldehyde yield by alkaline nitrobenzene oxidation of 10% by mass or more, preferably 12% by mass or more, more preferably 15% by mass or more, further preferably 20% by mass or more, furthermore preferably 21% by mass or more, and furthermore preferably 22% by mass or more, and preferably 40% by mass or less, more preferably 35% by mass or less, and further preferably 30% by mass or less.

<5>
The plant activating agent composition according to <4>, wherein the weight average molecular weight of the lignin decomposition product is preferably 1,000 or more, more preferably 3,000 or more, further preferably 4,500 or more, and furthermore preferably 8,000 or more, and, preferably 100,000 or less, more preferably 50,000 or less, further preferably 30,000 or less, furthermore preferably 26,000 or less, and furthermore preferably 20,000 or less.

<6>
The plant activating agent composition according to <4> or <5>, wherein the lignin decomposition product is contained in an amount of preferably 5% by mass or more, more preferably 15% by mass or more, and further preferably 30% by mass or more, and preferably 90% by mass or less, more preferably 80% by mass or less, and further preferably 70% by mass or less.

<7>
The plant activating agent composition according to any of <4> to <6>, containing a surfactant.

<8>
The plant activating agent composition according to <7>, wherein the surfactant is a nonionic surfactant.

<9>
The plant activating agent composition according to <7> or <8>, wherein the surfactant is contained in an amount of preferably 1 part by mass or more, more preferably 10 parts by mass or more, and further preferably 50 parts by mass or more, and preferably 1,900 parts by mass or less, more preferably 600 parts by mass or less, and further preferably 300 parts by mass or less per 100 parts by mass of the lignin decomposition product.

<10>
The plant activating agent composition according to any of <4> to <9>, containing a water soluble polymer.

<11>
The plant activating agent composition according to <10>, wherein the water soluble polymer is a water soluble polysaccharide polymer.

<12>
The plant activating agent composition according to <10> or <11>, wherein the water soluble polymer is contained in an amount of preferably 1 part by mass or more, more preferably 10 parts by mass or more, and further preferably 50 parts by mass or more, and preferably 1,900 parts by mass or less, more preferably 600 parts by mass or less, and further preferably 300 parts by mass or less per 100 parts by mass of the lignin decomposition product.

<13>
A method for growing a plant, including bringing a lignin decomposition product into contact with the plant, wherein the lignin decomposition product has an aldehyde yield by alkaline nitrobenzene oxidation of 10% by mass or more, preferably 12% by mass or more, more preferably 15% by mass or more, further preferably 20% by mass or more, furthermore preferably 21% by mass or more, and furthermore preferably 22% by mass or more, and preferably 40% by mass or less, more preferably 35% by mass or less, and further preferably 30% by mass or less.

<14>
The method for growing a plant according to <13>, wherein a treating solution containing the lignin decomposition product and water is brought into contact with the plant.

<15>
The method for growing a plant according to <14>, wherein the treating solution is a treating solution obtained by mixing a plant activating agent according to any of <1> to <3> or a plant activating agent composition according to any of <4> to <12> with water.

<16>
The method for growing a plant according to <14> or <15>, wherein the content of the lignin decomposition product in the treating solution is 1 ppm or more, more preferably 8 ppm or more, further preferably 20 ppm or more, and furthermore preferably 40 ppm or more, and preferably 5,000 ppm or less, more preferably 1,000 ppm or less, further preferably 500 ppm or less, and furthermore preferably 300 ppm or less.

<17>
The method for growing a plant according to any of <14> to <16>, wherein the treating solution is brought into contact with an underground part or an above-ground part of the plant.

<18>
The method for growing a plant according to any of <14> to <17>, wherein the treating solution is used as a culture solution for hydroponic cultivation to bring the lignin decomposition product into contact with the plant.

<19>
The method for growing a plant according to any of <14> to <18>, wherein the treating solution is brought as a culture solution for hydroponic cultivation into contact with an underground part of the plant.

<20>
The method for growing a plant according to <18> or <19>, wherein the content of the lignin decomposition product in the treating solution is preferably 1 ppm or more, more preferably 4 ppm or more, further preferably 8 ppm or more, and furthermore preferably 20 ppm or more, and preferably 3,000 ppm or less, more preferably 1,000 ppm or less, further preferably 100 ppm or less, and furthermore preferably 80 ppm or less.

<21>
The method for growing a plant according to any of <14> to <17>, wherein the treating solution is foliar-sprayed to bring the lignin decomposition product into contact with the plant.

<22>
The method for growing a plant according to <21>, wherein the amount of the treating solution sprayed is preferably 3 L/10 a or more, more preferably 5 L/10 a or more, further preferably 20 L/10 a or more, furthermore preferably 30 L/10 a or more, furthermore preferably 40 L/10 a or more, and furthermore preferably 50 L/10 a or more, and preferably 1,000 L/10 a or less, more preferably 500 L/10 a or less, further preferably 300 L/10 a or less, and furthermore preferably 100 L/10 a or less.

<23>
The method for growing a plant according to any of <14> to <22>, wherein the treating solution contains one or more components selected from a surfactant and a water soluble polymer.

<24>

The method for growing a plant according to any of <13> to <23>, wherein the plant is one or more selected from fruit vegetables, leaf vegetables, root vegetables, flowers, and beans, preferably beans.

<25>

A method for producing a plant activating agent, having the following step 1 and step 2a, Step 1: treating plant biomass with 8 parts by mass or more and 70 parts by mass or less of a basic compound and 10 parts by mass or more and 10,000 parts by mass or less of water relative to 100 parts by mass of the solid content of the plant biomass under the condition that the H-factor is 3,000 or less; and Step 2a: obtaining a lignin decomposition product as a water soluble component from the plant biomass that has undergone step 1 and adding an acid thereto to obtain a suspension containing the lignin decomposition product.

<26>

A method for producing a plant activating agent, having the following step 1 and step 2b, Step 1: treating plant biomass with 8 parts by mass or more and 70 parts by mass or less of a basic compound and 10 parts by mass or more and 10,000 parts by mass or less of water relative to 100 parts by mass of the solid content of the plant biomass under the condition that the H-factor is 3,000 or less; and Step 2b: obtaining a lignin decomposition product as a water soluble component from the plant biomass that has undergone step 1, purifying the lignin decomposition product by the addition of an organic solvent, and adding an acid thereto to obtain a suspension containing the lignin decomposition product.

<27>

The method for producing a plant activating agent according to <26>, wherein the lignin decomposition product is heated in the absence of solvent in step 2b.

<28>

The method for producing a plant activating agent according to <26> or <27>, wherein the organic solvent is a solvent containing at least one selected from alcohols having 1 or more and 3 or less carbon atoms.

<29>

The method for producing a plant activating agent according to any of <25> to <28>, wherein the following step 3 is performed after step 2a or step 2b, Step 3: heating the lignin decomposition product obtained in step 2a or step 2b.

<30>

The method for producing a plant activating agent according to any of <25> to <29>, wherein the plant biomass in step 1 is herbaceous biomass.

<31>

The method for producing a plant activating agent according to any of <25> to <30>, wherein the method is a method for producing a plant activating agent according to any of <1> to <3>.

<32>

Use, as a plant activating agent, of a lignin decomposition product having an aldehyde yield by alkaline nitrobenzene oxidation of 10% by mass or more, preferably 12% by mass or more, more preferably 15% by mass or more, further preferably 20% by mass or more, furthermore preferably 21% by mass or more, and furthermore preferably 22% by mass or more, and preferably 40% by mass or less, more preferably 35% by mass or less, and further preferably 30% by mass or less.

<33>

Use, as a plant activating agent composition, of a composition containing a lignin decomposition product having an aldehyde yield by alkaline nitrobenzene oxidation of 10% by mass or more, preferably 12% by mass or more, more preferably 15% by mass or more, further preferably 20% by mass or more, furthermore preferably 21% by mass or more, and furthermore preferably 22% by mass or more, and preferably 40% by mass or less, more preferably 35% by mass or less, and further preferably 30% by mass or less.

<34>

A lignin decomposition product used as a plant activating agent, wherein the lignin decomposition product has an aldehyde yield by alkaline nitrobenzene oxidation of 10% by mass or more, preferably 12% by mass or more, more preferably 15% by mass or more, further preferably 20% by mass or more, furthermore preferably 21% by mass or more, and furthermore preferably 22% by mass or more, and preferably 40% by mass or less, more preferably 35% by mass or less, and further preferably 30% by mass or less.

<35>

A composition containing a lignin decomposition product used as a plant activating agent composition, wherein the lignin decomposition product has an aldehyde yield by alkaline nitrobenzene oxidation of 10% by mass or more, preferably 12% by mass or more, more preferably 15% by mass or more, further preferably 20% by mass or more, furthermore preferably 21% by mass or more, and furthermore preferably 22% by mass or more, and preferably 40% by mass or less, more preferably 35% by mass or less, and further preferably 30% by mass or less.

<36>

A method for promoting the rooting of a plant, including bringing a lignin decomposition product having an aldehyde yield by alkaline nitrobenzene oxidation of 10% by mass or more into contact with the plant, preferably bringing a treating solution containing the lignin decomposition product and water into contact with the plant, and more preferably foliar-spraying the treating solution or using the treating solution as a culture solution for hydroponic cultivation to bring the lignin decomposition product into contact with the plant.

<37>

A method for increasing the branch emergence of a plant, including bringing a lignin decomposition product having an aldehyde yield by alkaline nitrobenzene oxidation of 10% by mass or more into contact with the plant, preferably bringing a treating solution containing the lignin decomposition product and water into contact with the plant, more preferably foliar-spraying the treating solution or using the treating solution as a culture solution for hydroponic cultivation to bring the lignin decomposition product into contact with the plant, and further preferably foliar-spraying the treating solution to bring the lignin decomposition product into contact with the plant.

<38>

A method for increasing the number of flowers of a plant, including bringing a lignin decomposition product having an aldehyde yield by alkaline nitrobenzene oxidation of 10% by mass or more into contact with the plant, preferably bringing a treating solution containing the lignin decomposition product and water into contact with the plant, more preferably foliar-spraying the treating solution or using the treating solution as a culture solution for hydroponic cultivation to bring the lignin decomposition product into contact with the plant, and further preferably foliar-spraying the treating solution to bring the lignin decomposition product into contact with the plant.

EXAMPLES

[Method for Measuring Aldehyde Yield of Lignin]

A 20 ml vial is charged with 50 mg of a lignin decomposition product, which is a measuring object, 7 ml of an aqueous 2 M sodium hydroxide solution, and 0.4 ml of nitrobenzene. The mixture is heated at 170° C. for 2.5 hours with stirring at 900 rpm. The mixture is cooled after heating and extracted with 10 ml of diethyl ether 3 times, followed by the removal of the reduced product of nitrobenzene and excessive nitrobenzene. Concentrated hydrochloric acid is added to the remaining water layer side, followed by the adjustment of the pH to 1 and the extraction with 10 ml of diethyl ether 3 times. This diethyl ether extract is vacuum-distilled to obtain an oxidized mixture. The volume of this oxidized mixture is increased with 20 mL dichloromethane. Then, 2 ml of the mixture is filtered through a millipore HVHP membrane (manufactured by Nihon Millipore K. K., 0.45 μm in pore size) and subjected to gas chromatography (GC).

A GC device (manufactured by Agilent Technologies Japan, Ltd.) equipped with an AgilentJ&W GC column DB-5 (manufactured by Agilent Technologies Japan, Ltd.) is used for gas chromatography. Conditions of gas chromatography are that the amount of a sample is set to 1.0 μL, the helium flow rate is 10 ml/min, the temperature of an injection port is 200° C., and the split ratio is 10:1. The temperature conditions are that the temperature is maintained at 60° C. for 1 minute, then raised at 5° C./min from 60 to 250° C. and maintained at 250° C. for 10 minutes. With regard to quantification, calibration curves of peak area versus content are created using three aldehydes, which are vanillin, syringa aldehyde and para-hydroxybenzaldehyde, as reagents, respectively. The yields of the above-mentioned three aldehydes in the lignin decomposition product are determined separately. The aldehyde yield (%) is calculated by the following expression.

Aldehyde yield (%)=(aldehyde mass yield obtained by totaling amounts of three aldehyde/mass of lignin decomposition product)×100

Production Example 1

Lignin decomposition product 1 used as a plant activating agent was manufactured by the following steps 1 and 2a.

(Step 1)

A glass bottle was charged with 30 g by dry mass of sugarcane bagasse as herbaceous biomass, and an aqueous 1.6% by mass sodium hydroxide solution was added thereto so that the solid content was 10% by mass. The glass bottle was heated at 95° C. and atmospheric pressure for 6 hours using an autoclave (Tomy Seiko Co., Ltd., LSX-700) to obtain a reaction product. The HF in step 1 was 3.5.

(Step 2a)

The reaction product obtained in step 1 was vacuum-filtered through a 400-mesh SUS mesh using a nutsche. The residue was washed with 300 mL of ion exchange water at 90° C. The filtrate and the washing liquid were collected, and the pH was adjusted to 4 with 1.0 M hydrochloric acid to obtain a suspension containing a lignin decomposition product.

The suspension obtained in step 2a was centrifuged.

Centrifugal separation was performed under the conditions of 10,000 rpm and 20 minutes using a "himac CR 20G III" manufactured by Hitachi Koki Co., Ltd.

After centrifugal separation, supernatant was removed, followed by the addition of 300 mL of ion exchange water and stirring. The mixture was then centrifuged again under the same condition as the above, followed by washing. Washing treatment was performed twice, and the pH was adjusted to 7 by the addition of an aqueous 1.0 M sodium hydroxide solution to the obtained precipitate. Subsequently, neutralized salts were removed by dialysis treatment, followed by the lyophilization of the obtained aqueous solution to obtain powdery lignin decomposition product 1. Spectra/Por6 Standard RC Pre-Wetted Dialysis Tube (MWCO; 1 kD) manufactured by Spectrum Laboratories Inc. was used in the dialysis treatment.

The aldehyde yield by alkaline nitrobenzene oxidation of lignin decomposition product 1 was 24.6% by mass, and the weight average molecular weight was 12,700.

The effective component content in lignin decomposition product 1 was 83% by mass. The effective component was calculated by the Klason lignin method. That is, the total lignin content was calculated by adding the rate of acid-insoluble lignin and the rate of acid-soluble lignin according to the TAPPI formal analysis method T222om-83.

Production Example 2

Lignin decomposition product 2 that was used as a plant activating agent was produced in the same way as in Production Example 1. However, step 2a was changed to the following step 2b.

(Step 2b)

The reaction product obtained in step 1 was vacuum-filtered through a 400-mesh SUS mesh using a nutsche. The residue was washed with 300 mL of ion exchange water at 90° C. The filtrate and the washing liquid were collected, followed by the addition of 2.4 L of methanol (produced by Wako Pure Chemical Corporation, guaranteed reagent). The deposit was vacuum-filtered (manufactured by Toyo Roshi Kaisha, Ltd., filter paper No. 2), followed by the removal of methanol from the filtrate by vacuum distillation. The pH was adjusted to 4 with 1.0 M hydrochloric acid to obtain a suspension containing a lignin decomposition product.

The suspension obtained in step 2b was centrifuged.

Centrifugal separation was performed under the conditions of 10000 rpm and 20 minutes using a "himac CR 20G III" manufactured by Hitachi Koki Co., Ltd.

After centrifugal separation, supernatant was removed, followed by the addition of 300 mL of ion exchange water and stirring. The mixture was then centrifuged again under the same condition as the above, followed by water washing. Water washing was performed twice, followed by the lyophilization of the obtained precipitate to obtain powdery lignin decomposition product 2.

The aldehyde yield by alkaline nitrobenzene oxidation of lignin decomposition product 2 was 22.5% by mass, and the weight average molecular weight was 9,065. The effective component content in lignin decomposition product 2 was 78% by mass.

Production Example 3

Powdery lignin decomposition product 3 used as a plant activating agent was produced in the same way as Production Example 2. However, the autoclave conditions in step 1 were 120° C. and 1 hour, and the concentration of an aqueous sodium hydroxide solution at the time of treatment was 5.0% by mass. The HF in step 1 was 12.8. When the effective component content in lignin decomposition product 3 was measured in the same way as Production Example 1, the effective component content was 54% by mass.

The aldehyde yield by alkaline nitrobenzene oxidation of lignin decomposition product 3 was 12.9% by mass, and the weight average molecular weight thereof was 8,125. These physical property values were measured in the same way as lignin decomposition product 1.

Production Example 4

Powdery lignin decomposition product 4 that was used as a plant activating agent was produced in the same way as in Production Example 2. However, the autoclave conditions in step 1 were set to 135° C. and 7 hours, and the concentration of an aqueous sodium hydroxide solution at the time of treatment was 5.0% by mass. The HF in step 1 was 64.4. When the effective component content in lignin decomposition product 4 was measured in the same way as Production Example 1, the effective component content was 53% by mass.

The aldehyde yield by alkaline nitrobenzene oxidation of lignin decomposition product 4 was 13.4% by mass, and the weight average molecular weight thereof was 4,559. These physical property values were measured in the same way as lignin decomposition product 1.

Production Example 5

Powdery lignin decomposition product 5 used as a plant activating agent was produced in the same way as Production Example 2. However, the autoclave conditions in step 1 were 25° C. and 2 hours. The HF in step 1 was 0.0. When the effective component content in lignin decomposition product 5 was measured in the same way as Production Example 1, the effective component content was 41.7% by mass.

The aldehyde yield by alkaline nitrobenzene oxidation of lignin decomposition product 5 was 26.0% by mass, and the weight average molecular weight thereof was 9,994. These physical property values were measured in the same way as lignin decomposition product 1.

Production Example 6

Powdery lignin decomposition product 6 used as a plant activating agent was produced by subjecting lignin decomposition product 2 obtained in Production Example 2 to the treatment of the following step 3.

(Step 3)

Heat treatment was performed at 120° C. and for 5 minutes in the absence of solvent using a halogen moisture meter HG63 (manufactured by METTLER TOLEDO K. K.). Heat treatment time was defined as time after the temperature reached 120° C., temperature increase was defined as time until the temperature in the equipment reached 120° C., and temperature decrease was performed without any treatment by rapidly exposing the lignin decomposition product to room temperature after heat treatment.

When the effective component content in lignin decomposition product 6 was measured in the same way as Production Example 1, the effective component content was 66.9% by mass.

The aldehyde yield by alkaline nitrobenzene oxidation of lignin decomposition product 6 was 15.4% by mass, and the weight average molecular weight thereof was 18,289. These physical property values were measured in the same way as lignin decomposition product 1.

Production Example 7

Powdery lignin decomposition product 7 used as a plant activating agent was produced in the same way as Production Example 6. However, the heating treatment conditions in step 3 were 140° C. and 5 minutes. When the effective component content in lignin decomposition product 7 was measured in the same way as Production Example 1, the effective component content was 69.8% by mass.

The aldehyde yield by alkaline nitrobenzene oxidation of lignin decomposition product 7 was 14.4% by mass, the weight average molecular weight thereof was 25,663. These physical property values were measured in the same way as lignin decomposition product 1.

Production Example 8

Powdery lignin decomposition product 8 used as a plant activating agent was produced by subjecting lignin decomposition product 2 obtained in Production Example 2 to the treatment of the following step 4.

(Step 4)

Lignin decomposition product 2 was dispersed in ion exchange water to obtain a 0.2% suspension, which was filtered through a filter paper No. 2 (manufactured by Advantec Toyo Kaisha, Ltd.) to obtain a filtrate. Fraction treatment was performed on the obtained filtrate using a pencil type module (manufactured by Asahi Kasei Corporation, Model: SIP-0013 (UF)).

When the effective component content in lignin decomposition product 8 was measured in the same way as Production Example 1, the effective component content was 78.7% by mass.

The aldehyde yield by alkaline nitrobenzene oxidation of lignin decomposition product 8 was 12.6% by mass, and the weight average molecular weight thereof was 14,491. These physical property values were measured in the same way as lignin decomposition product 1.

Production Example 9

Powdery lignin decomposition product 9 was produced in the same way as in Production Example 2. However, the autoclave conditions in step 1 were set to 135° C. and 7 hours. HF in step 1 was 64.4. When the effective component content in lignin decomposition product 9 was measured in the same way as in Production Example 1, the effective component content was 66% by mass.

The aldehyde yield by alkaline nitrobenzene oxidation of lignin decomposition product 9 was 9.0% by mass, and the weight average molecular weight was 5,121. These physical property values were measured in the same way as in lignin decomposition product 1.

Example 1

When the lignin decomposition product of the present invention was used as a plant activating agent and added to a hydroponic culture medium, its growth promoting effect on soybeans was evaluated.

Soybean species "Fukuyutaka" was preliminarily cultivated (sown in artificial soil vermiculite and cultivated) until the 2nd to 3rd true leaf stage. Evenly grown seedlings were selected, and the roots were washed to remove the soil. Subsequently, all the lateral roots of the soybeans were cut off, followed by hydroponics in tap water for 1 day for the acclimatization of the seedlings. The initial biomass of each seedling thus acclimatized was measured, and the seedlings were arranged in ascending order of the initial biomass and distributed such that the average mass value was constant among experimental plots. The biomass is the mass of a measuring object measured after removal of moisture attached to the surface of the measuring object.

The soybean seedlings were inserted in bottle containers (J Bottle Round, Wide mouth, Natural manufactured by Nikko Hansen & Co., Ltd., capacity: 250 ml) that were made of plastic (high-density polyethylene) and each contained 250 ml of a culture medium containing lignin decomposition product 1 which was a plant activating agent at the content shown in Table 1 (the balance was water) such that the cotyledons were caught in the brims of the containers to start hydroponics.

Hydroponics was performed in a greenhouse whose temperature, humidity, and light quantity were adjustable. The temperature and the humidity were based on the external environment, and the temperature was automatically adjusted when the air temperature fell outside the range of 15 to 30° C. The sunlight condition also basically conformed to the external environment, but was set such that supplemental lighting illuminated from 16:00 to 20:00, irrespective of illumination or sunset time.

Ten days after the start of cultivation, the soybean seedlings were taken out of the containers, followed by the measurement of the dry masses of underground parts. The number of pots (the number of repetitions) was 7 per type of the culture medium, and an average value thereof was determined. Each average value is shown in Table 1 as a relative value to the dry mass of a control defined as 100. The control was executed without the addition of the plant activating agent. Herein, the underground part as to soybeans was defined as a part corresponding to the lower part of a soybean seedling cut at the cotyledonary node. The dry mass was defined as the mass of a measuring object measured after the measuring object was dried at 80° C. for 1 day and brought back to room temperature.

TABLE 1

|  | Control | Example 1-1 | Example 1-2 | Example 1-3 |
|---|---|---|---|---|
| Lignin decomposition product 1 | 0 | 5 ppm | 10 ppm | 50 ppm |
| Water | Balance | Balance | Balance | Balance |
| Total (10 thousand ppm) | 100 | 100 | 100 | 100 |
| Underground part dry mass (relative value) | 100 (reference) | 113 | 111 | 130 |

Example 2 and Comparative Example 2

Example 2a and Comparative Example 2a

When the lignin decomposition product of the present invention, etc was used as a plant activating agent and foliar-sprayed, its growth promoting effect on soybeans was evaluated.

Soybean seedlings were prepared in the same way as in Example 1.

The soybean seedlings were applied to bottle containers that were made of plastic (high-density polyethylene) and each contained 250 ml of a fertilizer solution (trade name HYPONICA, manufactured by Kyowa Co., Ltd., used as a 500-fold dilution).

Regions of 1.0 m in length×0.5 m in width viewed in a plane were used as test regions (0.5 $m^2$), and 6 bottle containers containing the seedlings were arranged per region.

Immediately after arrangement, 25 ml of a treating solution having the constitution of Table 2 (the balance was water) was uniformly sprayed per test region from above the seedlings for the first spraying. After spraying, hydroponics was performed One week later, the second spraying was perforated in the same way as in the first spraying. The spraying of 25 ml per test region (0.5 $m^2$) corresponds to the spraying of 50 L/10 a. The total amount of the sprays in this example was 100 L/10 a.

After the second spraying treatment, cultivation was continued for 1 week to terminate the test (the test was terminated 2 weeks after the first spraying).

The containers used and the hydroponics abided by the same conditions as in Example 1.

After the completion of cultivation, the dry masses of underground parts of the soybean seedlings were measured in the same way as in Example 1. The results are shown in Table 2a as relative values to the dry mass of a control defined as 100. In this example, the number of pots (the number of repetition) was 6 per type of the treating solution, and an average value thereof was determined.

TABLE 2a

|  | Control | Example 2a-1 | 2a-2 | 2a-3 | 2a-4 | 2a-5 | 2a-6 | 2a-7 | 2a-8 |
|---|---|---|---|---|---|---|---|---|---|
| Lignin decomposition product 1 (Aldehyde yield: 24.6% by mass) | 0 | 100 ppm | 100 ppm | 100 ppm | 0 | 0 | 0 | 0 | 0 |
| Lignin decomposition product 2 (Aldehyde yield: 22.5% by mass) | 0 | 0 | 0 | 0 | 100 ppm | 0 | 0 | 0 | 0 |
| Lignin decomposition product 3 (Aldehyde yield: 12.9% by mass) | 0 | 0 | 0 | 0 | 0 | 100 ppm | 0 | 0 | 0 |
| Lignin decomposition product 4 (Aldehyde yield: 13.4% by mass) | 0 | 0 | 0 | 0 | 0 | 0 | 100 ppm | 0 | 0 |
| Lignin decomposition product 5 (Aldehyde yield: 26.0% by mass) | 0 | 0 | 0 | 0 | 0 | 0 | 0 | 100 ppm | 0 |

TABLE 2a-continued

|  | | | | | | | | | |
|---|---|---|---|---|---|---|---|---|---|
| Lignin decomposition product 6 (Aldehyde yield: 15.4% by mass) | 0 | 0 | 0 | 0 | 0 | 0 | 0 | 0 | 100 ppm |
| Lignin decomposition product 7 (Aldehyde yield: 14.4% by mass) | 0 | 0 | 0 | 0 | 0 | 0 | 0 | 0 | 0 |
| Lignin decomposition product 8 (Aldehyde yield: 12.6% by mass) | 0 | 0 | 0 | 0 | 0 | 0 | 0 | 0 | 0 |
| Na lignin sulfonafe | 0 | 0 | 0 | 0 | 0 | 0 | 0 | 0 | 0 |
| Black liquid lignin (Aldehyde yield: 9.9% by mass) | 0 | 0 | 0 | 0 | 0 | 0 | 0 | 0 | 0 |
| Lignin decomposition product 9 (Aldehyde yield: 9.0% by mass) | 0 | 0 | 0 | 0 | 0 | 0 | 0 | 0 | 0 |
| Nonionic surfactant 1 | 0 | 1000 ppm | 0 | 0 | 1000 ppm | 1000 ppm | 1000 ppm | 1000 ppm | 1000 ppm |
| HPMC1 | 0 | 0 | 1000 ppm | 0 | 0 | 0 | 0 | 0 | 0 |
| Water | Balance | Balance | Balance | Balance | Balance | Balance | Balance | Balance | Balance |
| Total (10 thousand ppm) | 100 | 100 | 100 | 100 | 100 | 100 | 100 | 100 | 100 |
| Underground part drymass (relative value) | 100 (reference) | 125 | 114 | 116 | 128 | 107 | 139 | 121 | 113 |

|  | Example | | Comparative Example | | | | | |
|---|---|---|---|---|---|---|---|---|
|  | 2a-9 | 2a-10 | 2a-1 | 2a-2 | 2a-3 | 2a-4 | 2a-5 | 2a-6 |
| Lignin decomposition product 1 (Aldehyde yield: 24.6% by mass) | 0 | 0 | 0 | 0 | 0 | 0 | 0 | 0 |
| Lignin decomposition product 2 (Aldehyde yield: 22.5% by mass) | 0 | 0 | 0 | 0 | 0 | 0 | 0 | 0 |
| Lignin decomposition product 3 (Aldehyde yield: 12.9% by mass) | 0 | 0 | 0 | 0 | 0 | 0 | 0 | 0 |
| Lignin decomposition product 4 (Aldehyde yield: 13.4% by mass) | 0 | 0 | 0 | 0 | 0 | 0 | 0 | 0 |
| Lignin decomposition product 5 (Aldehyde yield: 26.0% by mass) | 0 | 0 | 0 | 0 | 0 | 0 | 0 | 0 |
| Lignin decomposition product 6 (Aldehyde yield: 15.4% by mass) | 0 | 0 | 0 | 0 | 0 | 0 | 0 | 0 |
| Lignin decomposition product 7 (Aldehyde yield: 14.4% by mass) | 100 ppm | 0 | 0 | 0 | 0 | 0 | 0 | 0 |
| Lignin decomposition product 8 (Aldehyde yield: 12.6% by mass) | 0 | 100 ppm | 0 | 0 | 0 | 0 | 0 | 0 |
| Na lignin sulfonafe | 0 | 0 | 0 | 100 ppm | 0 | 100 ppm | 0 | 0 |
| Black liquid lignin (Aldehyde yield: 9.9% by mass) | 0 | 0 | 0 | 0 | 100 ppm | 0 | 100 ppm | 0 |
| Lignin decomposition product 9 (Aldehyde yield: 9.0% by mass) | 0 | 0 | 0 | 0 | 0 | 0 | 0 | 100 ppm |
| Nonionic surfactant 1 | 1000 ppm | 1000 ppm | 1000 ppm | 1000 ppm | 1000 ppm | 0 | 0 | 1000 ppm |
| HPMC1 | 0 | 0 | 0 | 0 | 0 | 0 | 0 | 0 |
| Water | Balance | Balance | Balance | Balance | Balance | Balance | Balance | Balance |
| Total (10 thousand ppm) | 100 | 100 | 100 | 100 | 100 | 100 | 100 | 100 |
| Underground part drymass (relative value) | 113 | 111 | 104 | 100 | 102 | 103 | 94 | 94 |

The components in the table are as described below (the same holds true for the other tables).

Na lignin sulfonate: reagent, manufactured by Sigma Aldrich Co LLC

Black liquid lignin: the aldehyde yield by alkaline nitrobenzene oxidation was 9.9% by mass, and the weight average molecular weight was 5,300.

Nonionic surfactant 1: polyoxysorbitan monooleate (average number of moles of ethylene oxide added: 20), RHEODOL TW-0120, manufactured by Kao Corp.

HPMC1: hydroxypropylmethylcellulose, METOLOSE 60SH10000, manufactured by Shin-Etsu Chemical Co., Ltd., water soluble polymer Example 2b and Comparative Example 2b When the lignin decomposition product of the present invention, etc. was foliar-sprayed as a plant activating agent, its effect of increasing the number of lateral roots on soybeans was evaluated.

Soybean seedlings, a fertilizer solution, and containers were prepared in the same way as in Example 2, and hydroponics was started. Immediately after arrangement, a treating solution having the constitution shown in Table 2b (the balance was water) was sprayed using the same amount of the treating solution and the same treatment method as in the spraying of Example 2a and Comparative Example 2a. However, spraying treatment was performed once. After spraying treatment, cultivation was continued for 5 days to terminate the test.

At the completion of cultivation, the number of lateral roots that newly emerged from the main roots of the soybeans was measured. The results are shown in Table 2b as relative values to the number of roots of a control defined as 100. In this example, the number of pots (the number of repetition) was 5 per type of the treating solution, and an average value thereof was determined.

TABLE 2b

|  | Control | \multicolumn{8}{c}{Example} | Comparative Example |
|---|---|---|---|---|---|---|---|---|---|---|
|  |  | 2b-1 | 2b-2 | 2b-3 | 2b-4 | 2b-5 | 2b-6 | 2b-7 | 2b-8 | 2b-1 |
| Lignin decomposition product 1 (Aldehyde yield: 24.6% by mass) | 0 | 100 ppm | 0 | 0 | 0 | 0 | 0 | 0 | 0 | 0 |
| Lignin decomposition product 2 (Aldehyde yield: 22.5% by mass) | 0 | 0 | 100 ppm | 0 | 0 | 0 | 0 | 0 | 0 | 0 |
| Lignin decomposition product 3 (Aldehyde yield: 12.9% by mass) | 0 | 0 | 0 | 100 ppm | 0 | 0 | 0 | 0 | 0 | 0 |
| Lignin decomposition product 4 (Aldehyde yield: 13.4% by mass) | 0 | 0 | 0 | 0 | 100 ppm | 0 | 0 | 0 | 0 | 0 |
| Lignin decomposition product 5 (Aldehyde yield: 26.0% by mass) | 0 | 0 | 0 | 0 | 0 | 100 ppm | 0 | 0 | 0 | 0 |
| Lignin decomposition product 6 (Aldehyde yield: 15.4% by mass) | 0 | 0 | 0 | 0 | 0 | 0 | 100 ppm | 0 | 0 | 0 |
| Lignin decomposition product 7 (Aldehyde yield: 14.4% by mass) | 0 | 0 | 0 | 0 | 0 | 0 | 0 | 100 ppm | 0 | 0 |
| Lignin decomposition product 8 (Aldehyde yield: 12.6% by mass) | 0 | 0 | 0 | 0 | 0 | 0 | 0 | 0 | 100 ppm | 0 |
| Lignin decomposition product 9 (Aldehyde yield: 9.0% by mass) | 0 | 0 | 0 | 0 | 0 | 0 | 0 | 0 | 0 | 100 ppm |
| Nonionic surfactant 1 | — | 1000 ppm | 1000 ppm | 1000 ppm | 1000 ppm | 1000 ppm | 1000 ppm | 1000 ppm | 1000 ppm | 1000 ppm |
| Water | Balance | Balance | Balance | Balance | Balance | Balance | Balance | Balance | Balance | Balance |
| Total (10 thousand ppm) | 100 | 100 | 100 | 100 | 100 | 100 | 100 | 100 | 100 | 100 |
| The number of roots (relative value) | 100 (reference) | 113 | 117 | 138 | 114 | 123 | 116 | 116 | 119 | 110 |

Example 2c and Comparative Example 2c

When the lignin decomposition product of the present invention, etc. was foliar-sprayed as a plant activating agent, its effect of increasing the number of branches on soybeans was evaluated.

Soybean seedlings were prepared in the same way as in Example 1.

The soybean seedlings were planted in seedling growing pots that were made of polyethylene (diameter: 9 cm) and fed with cultivation soil (trade name Takii Nursery Soil, manufactured by Takii & Co., Ltd), and cultivation was continued. At the beginning time of branch emergence (4th to 6th true leaf stage), the seedlings (5 pots made of polyethylene during cultivation) were evenly arranged per plane of 1.0 m long and 1.0 m wide (test region (1.0 m$^2$) as one experimental plot. Immediately after arrangement, a treating solution having the constitution shown in Table 2c (the balance was water) was uniformly sprayed from 10 to 15 cm above the seedlings by the same treatment method as in Example 2a and Comparative Example 2a. However, the amount of the treating solution was 100 ml. One week later, the second spraying was performed in the same way as in the first spraying. The spraying of 100 ml per test region (1.0 m$^2$) corresponds to the spraying of 100 L/10 a. The total amount of the sprays in this example was 200 L/10 a.

After the second spraying treatment, cultivation was continued for 1 week to terminate the test. At the completion of cultivation, the total number of branches that emerged from the soybean seedlings was measured. The results are shown in Table 2c as relative values to the number of branches of a control defined as 100. In this example, the number of pots (the number of repetition) was 5 per type of the treating solution, and an average value thereof was determined.

TABLE 2c

|  | Control | \multicolumn{8}{c}{Example} | \multicolumn{2}{c}{Comparative Example} |
|---|---|---|---|---|---|---|---|---|---|---|---|
|  |  | 2c-1 | 2c-2 | 2c-3 | 2c-4 | 2c-5 | 2c-6 | 2c-7 | 2c-8 | 2c-1 | 2c-2 |
| Lignin decomposition product 1 (Aldehyde yield: 24.6% by mass) | 0 | 100 ppm | 0 | 0 | 0 | 0 | 0 | 0 | 0 | 0 | 0 |
| Lignin decomposition product 2 (Aldehyde yield: 22.5% by mass) | 0 | 0 | 100 ppm | 0 | 0 | 0 | 0 | 0 | 0 | 0 | 0 |
| Lignin decomposition product 3 (Aldehyde yield: 12.9% by mass) | 0 | 0 | 0 | 100 ppm | 0 | 0 | 0 | 0 | 0 | 0 | 0 |
| Lignin decomposition product 4 (Aldehyde yield: 13.4% by mass) | 0 | 0 | 0 | 0 | 100 ppm | 0 | 0 | 0 | 0 | 0 | 0 |
| Lignin decomposition product 5 (Aldehyde yield: 26.0% by mass) | 0 | 0 | 0 | 0 | 0 | 100 ppm | 0 | 0 | 0 | 0 | 0 |
| Lignin decomposition product 6 (Aldehyde yield: 15.4% by mass) | 0 | 0 | 0 | 0 | 0 | 0 | 100 ppm | 0 | 0 | 0 | 0 |
| Lignin decomposition product 7 (Aldehyde yield: 14.4% by mass) | 0 | 0 | 0 | 0 | 0 | 0 | 0 | 100 ppm | 0 | 0 | 0 |
| Lignin decomposition product 8 (Aldehyde yield: 12.6% by mass) | 0 | 0 | 0 | 0 | 0 | 0 | 0 | 0 | 100 ppm | 0 | 0 |

TABLE 2c-continued

|  | Control | Example 2c-1 | Example 2c-2 | Example 2c-3 | Example 2c-4 | Example 2c-5 | Example 2c-6 | Example 2c-7 | Example 2c-8 | Comparative Example 2c-1 | Comparative Example 2c-2 |
|---|---|---|---|---|---|---|---|---|---|---|---|
| Lignin decomposition product 9 (Aldehyde yield: 9.0% by mass) | 0 | 0 | 0 | 0 | 0 | 0 | 0 | 0 | 0 | 0 | 100 ppm |
| Nonionic surfactant 1 | — | 1000 ppm | 1000 ppm | 1000 ppm | 1000 ppm | 1000 ppm | 1000 ppm | 1000 ppm | 1000 ppm | 1000 ppm | 1000 ppm |
| Water | Balance | Balance | Balance | Balance | Balance | Balance | Balance | Balance | Balance | Balance | Balance |
| Total (10 thousand ppm) | 100 | 100 | 100 | 100 | 100 | 100 | 100 | 100 | 100 | 100 | 100 |
| The number of branches (relative value) | 100 (reference) | 135 | 113 | 113 | 123 | 113 | 113 | 109 | 115 | 100 | 107 |

Example 2d and Comparative Example 2d

When the lignin decomposition product of the present invention, etc. was foliar-sprayed as a plant activating agent, its effect of increasing the number of flowers on soybeans was evaluated.

Soybean seedlings were prepared in the same way as in Example 1. The soybean seedlings were planted in seedling growing pots that were made of polyethylene and fed with cultivation soil (trade name Takii. Nursery Soil, manufactured by Takii & Co., Ltd). Then, cultivation in the pots was continued, and the seedlings were further replanted in 1/5,000 a Wagner Pots NF-5 (manufactured by AS ONE Corporation) around a lapse of 1 month after planting in the pots.

The state of leaves was at the 6th to 9th true leaf stage which corresponded to the initial stage of flowering. The seedlings (4 or 5 Wagner Pots during cultivation) were evenly arranged per plane of 1.0 m long and 1.0 m wide (test region (1.0 m$^2$) as one experimental plot. Immediately after arrangement, a treating solution having the constitution shown in Table 2d (the balance was water) was uniformly sprayed from 10 to 15 cm above the seedlings by the same treatment method as in Example 2a and Comparative Example 2a. However, the amount of the treating solution was 100 ml. One week later, the second spraying was performed in the same way as in the first spraying.

After the second spraying treatment, cultivation was continued while the number of flowers was measured on a leaf age basis. The results of measuring the number of flowers at leaf age at the time of the first treatment are shown in Table 2d as relative values to the number of flowers of a control defined as 100. The measurement timing was the beginning time of pod setting (after a lapse of 2 to 6 weeks after spraying). In this example, the number of pots (the number of repetition) was 4 or 5 per type of the treating solution, and an average value thereof was determined.

TABLE 2d

|  | Control | Example 2d-1 | Example 2d-2 | Example 2d-3 | Example 2d-4 | Example 2d-5 | Comparative Example 2d-1 |
|---|---|---|---|---|---|---|---|
| Lignin decomposition product 1 (Aldehyde yield: 24.6% by mass) | 0 | 100 ppm | 0 | 0 | 0 | 0 | 0 |
| Lignin decomposition product 2 (Aldehyde yield: 22.5% by mass) | 0 | 0 | 100 ppm | 0 | 0 | 0 | 0 |
| Lignin decomposition product 3 (Aldehyde yield: 12.9% by mass) | 0 | 0 | 0 | 100 ppm | 0 | 0 | 0 |
| Lignin decomposition product 4 (Aldehyde yield: 13.4% by mass) | 0 | 0 | 0 | 0 | 100 ppm | 0 | 0 |
| Lignin decomposition product 5 (Aldehyde yield: 26.0% by mass) | 0 | 0 | 0 | 0 | 0 | 100 ppm | 0 |
| Lignin decomposition product 9 (Aldehyde yield: 9.0% by mass) | 0 | 0 | 0 | 0 | 0 | 0 | 100 ppm |
| Nonionic surfactant 1 | 0 | 1000 ppm | 1000 ppm | 1000 ppm | 1000 ppm | 1000 ppm | 1000 ppm |
| Water | Balance | Balance | Balance | Balance | Balance | Balance | Balance |
| Total (10 thousand ppm) | 100 | 100 | 100 | 100 | 100 | 100 | 100 |
| The number of flowers (relative value) | 100 (reference) | 340 | 161 | 133 | 171 | 181 | 122 |

Example 3

When the lignin decomposition product of the present invention was used as a plant activating agent and added to a hydroponic culture medium, its growth promoting effect on tomatoes was evaluated.

Tomato species "Momotaro" was preliminarily cultivated (sown in artificial soil vermiculite and cultivated) until the 2nd to 3rd true leaf stage. Evenly grown seedlings were selected, and the roots were washed to remove the soil. Subsequently, all the lateral roots of the tomatoes were cut off, followed by hydroponics in tap water for 1 day for the acclimatization of the seedlings. The initial biomass of each seedling thus acclimatized was measured, and the seedlings were arranged in ascending order of the initial biomass and distributed such that the average mass value was constant among experimental plots The tomato seedlings were inserted in bottle containers that were made of plastic (high-density polyethylene) and each contained 250 ml of a culture medium containing lignin decomposition product 1 which was a plant activating agent at the content shown in Table 3 (the balance was water) to start hydroponics. The containers used and the hydroponics abided by the same conditions as in Example 1.

Seven days after the start of cultivation, the tomato seedlings were taken out of the containers, followed by the measurement of the dry masses of underground parts. The number of pots (the number of repetitions) was 7 per type of the culture medium, and an average value thereof was determined. Each average value is shown in Table 3 as a relative value to the dry mass of a control defined as 100 The control was executed without the addition of the plant activating agent. Herein, the underground part as to tomatoes was defined as a collection of all cut tomato lateral roots. The dry mass was defined as the mass of a measuring object measured after the measuring object was dried at 80° C. for 1 day and brought back to room temperature.

TABLE 3

|  | Control | Example |  |  |
|---|---|---|---|---|
|  |  | 3-1 | 3-2 | 3-3 |
| Lignin decomposition product 1 | 0 | 10 ppm | 100 ppm | 300 ppm |
| Water | Balance | Balance | Balance | Balance |
| Total (10 thousand ppm) | 100 | 100 | 100 | 100 |
| Underground part dry mass (relative value) | 100 (reference) | 134 | 164 | 135 |

Example 4

When the lignin decomposition product of the present invention was used as a plant activating agent and foliar-sprayed, its growth promoting effect on tomatoes was evaluated.

Tomato seedlings were prepared in the same way as in Example 3.

The tomato seedlings were applied to bottle containers that were made of plastic (high-density polyethylene) and each contained 250 ml of a fertilizer solution (trade name HYPONICA, manufactured by Kyowa Co., Ltd., used as a 500-fold dilution).

25 ml of a treating solution having the constitution of Table 4 (the balance was water) was foliar-sprayed under the same condition as in Example 2. The containers used and the hydroponics abided by the same conditions as in Example 1.

After the completion of cultivation, the dry masses of underground parts of the tomato seedlings were measured in the same way as in Example 3. The results are shown in Table 4 as relative values to the dry mass of a control defined as 100. In this example, the number of pots (the number of repetition) was 6 per type of the treating solution, and an average value thereof was determined.

TABLE 4

|  | Control | Example | |
|---|---|---|---|
|  |  | 4-1 | 4-2 |
| Lignin decomposition product 1 | 0 | 100 ppm | 1000 ppm |
| Water | Balance | Balance | Balance |
| Total (10 thousand ppm) | 100 | 100 | 100 |
| Underground part dry mass (relative value) | 100 (reference) | 108 | 112 |

The invention claimed is:

1. A method for growing a plant, comprising
providing a treating solution containing water, a nonionic surfactant, and a lignin decomposition product having an aldehyde yield by alkaline nitrobenzene oxidation of 10% by mass or more, and
bringing said treating solution into contact with the plant, wherein the nonionic surfactant is selected from polyoxyethylene sorbitan fatty acid ester, polyoxyethylene fatty acid ester, polyglycerin fatty acid ester, polyoxyethylene alkyl aryl ether, polyoxyalkylene aryl ether, and polyoxyalkylene alkyl polyglycoside
wherein the weight average molecular weight of the lignin decomposition product is 1000 or more and 100,000 or less,
wherein the content of the lignin decomposition product in the treating solution is 1 ppm or more and 5,000 ppm or less, and
wherein the surfactant is contained in an amount of 1 part by mass or more and 1,900 parts by mass or less per 100 parts by mass of the lignin decomposition product; and
wherein the lignin decomposition product is produced by a method comprising the following Step 1 and Step 2a, or comprising the following Step 1 and Step 2b,
Step 1: treating plant biomass with 8 parts by mass or more and 70 parts by mass or less of a basic compound and 10 parts by mass or more and 10,000 parts by mass or less of water relative to 100 parts by mass of the solid content of the plant biomass under the condition that the H-factor is 3,000 or less,
Step 2a: obtaining a lignin decomposition product as a water soluble component from the plant biomass that has undergone step 1 and adding an acid thereto to obtain a suspension containing the lignin decomposition product,
Step 2b: obtaining a lignin decomposition product as a water soluble component from the plant biomass that has undergone step 1, purifying the lignin decomposition product by the addition of an organic solvent, and adding an acid thereto to obtain a suspension containing the lignin decomposition product.

2. The method for growing a plant according to claim 1, wherein the treating solution additionally contains a water soluble polymer.

3. The method for growing a plant according to claim 1, wherein the treating solution is used as a culture solution for hydroponic cultivation to bring the lignin decomposition product into contact with the plant.

4. The method for growing a plant according to claim 1, wherein the treating solution is foliar-sprayed to bring the lignin decomposition product into contact with the plant.

5. The method for growing a plant according to claim 1, wherein the lignin decomposition product being in the form of a powder having an average particle size in the range 3 to 30 μm.

* * * * *